(No Model.) 2 Sheets—Sheet 1.
V. T. SWEENEY.
VEHICLE BRAKE.
No. 573,246. Patented Dec. 15, 1896.
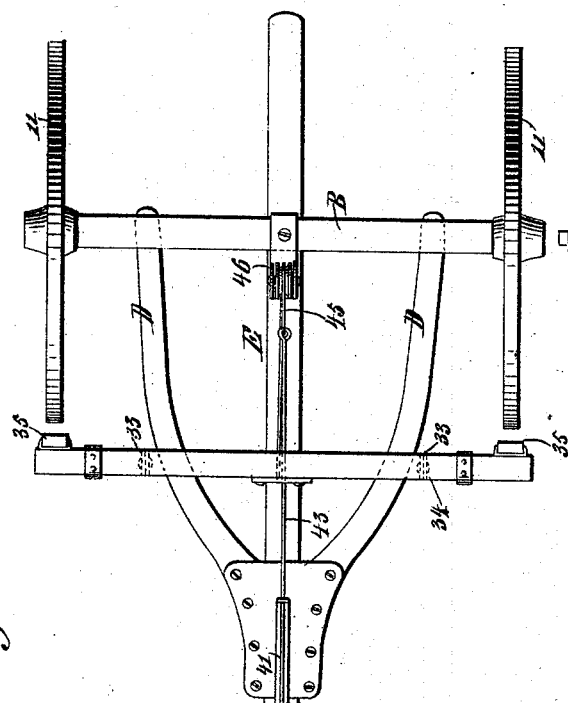
Fig. 1.
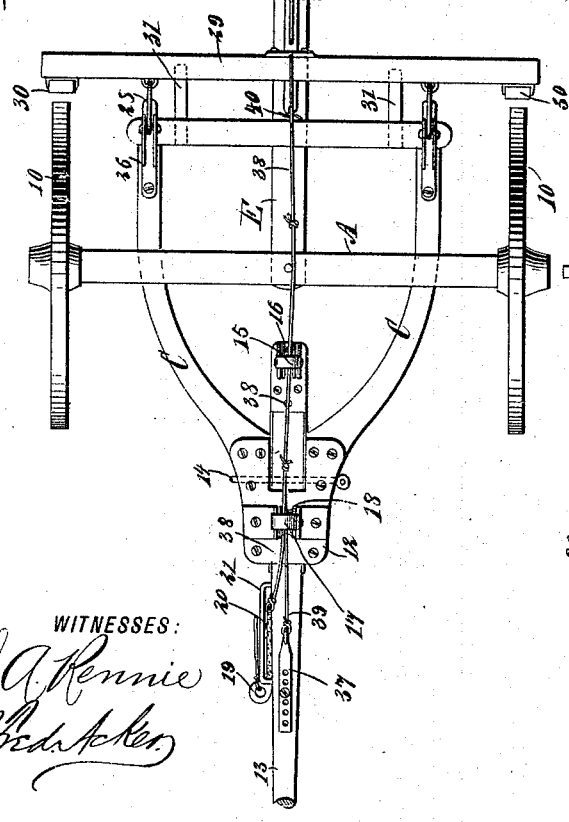
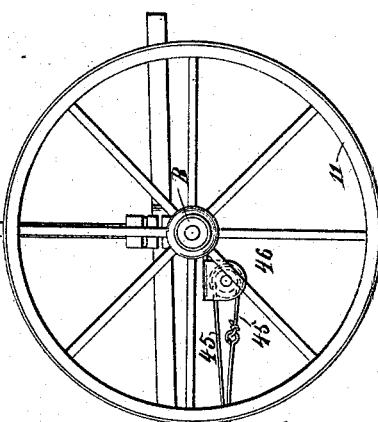
Fig. 2.
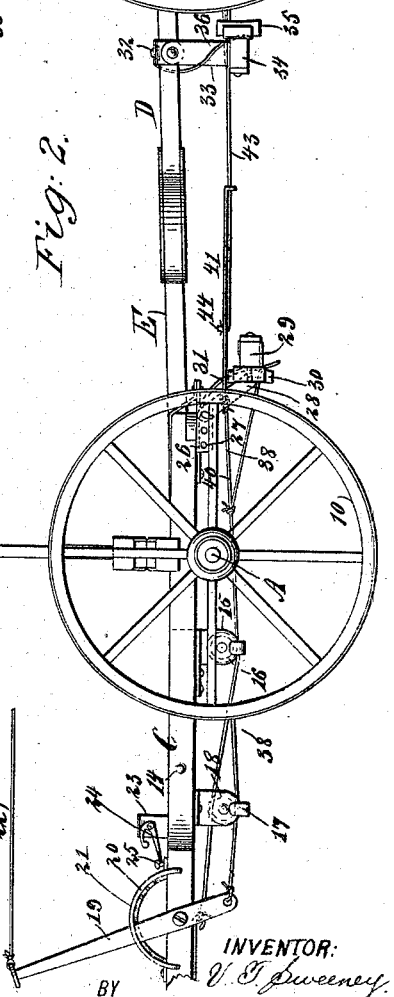
WITNESSES:
J. A. Rennie
Fred Acker
INVENTOR:
V. T. Sweeney
BY
Munn
ATTORNEYS.

(No Model.)　　　　　　V. T. SWEENEY.　　　2 Sheets—Sheet 2.
VEHICLE BRAKE.
No. 573,246.　　　　　　　　　　Patented Dec. 15, 1896.
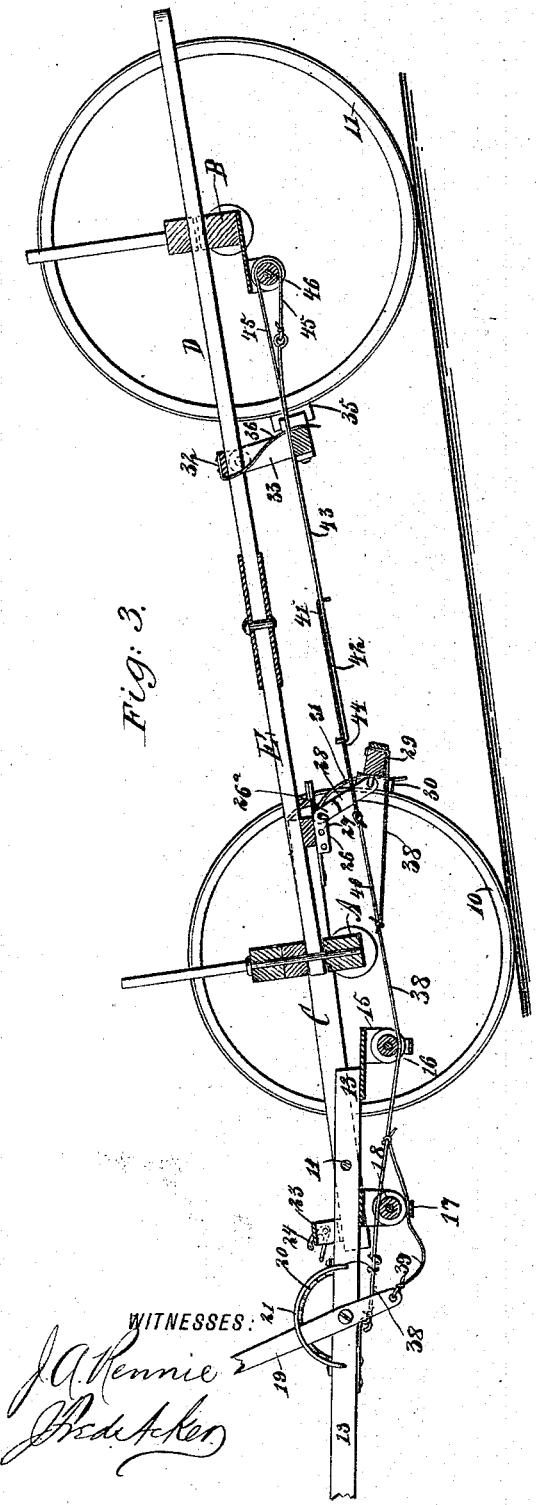
WITNESSES:
INVENTOR
V. T. Sweeney
BY
ATTORNEYS.

UNITED STATES PATENT OFFICE.

VARDIMAN T. SWEENEY, OF SPRINGFIELD, KENTUCKY.

VEHICLE-BRAKE.

SPECIFICATION forming part of Letters Patent No. 573,246, dated December 15, 1896.

Application filed May 22, 1896. Serial No. 592,582. (No model.)

*To all whom it may concern:*

Be it known that I, VARDIMAN TAYLOR SWEENEY, of Springfield, in the county of Washington and State of Kentucky, have invented a new and useful Improvement in Vehicle-Brakes, of which the following is a full, clear, and exact description.

The object of my invention is to improve upon the construction of the vehicle-brakes for which Letters Patent were granted to me October 18, 1892, No. 484,687, and November 6, 1894, No. 528,826, the prime object of the invention being to simplify the construction of such brakes as are adapted to be applied by the action of the team in backing and to provide a means whereby the said brakes may be applied by hand as readily as by the team.

A further object of the invention is to so construct the brake-operating mechanism that when the vehicle is on an incline and the tongue or pole is free to act the brakes will be automatically applied owing to the inclination of the tongue, due to the team in holding back.

Another object of the invention is to provide an improved device for suspending the brake-beam, whereby lost motion may be readily taken up, and, furthermore, to provide for the taking up of lost motion in the chains or cables employed in the carrying out of the invention.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is an inverted plan view of the running-gear of the vehicle, illustrating the application of the improvement thereto. Fig. 2 is a side elevation of the aforesaid running-gear and the applied brakes. Fig. 3 is a longitudinal vertical section taken at a central point through the running-gear and illustrating the said running-gear as on an incline and the brakes as applied, and Fig. 4 is a detail perspective view of the take-up mechanism used in the connecting devices employed between the brake-beams and the tongue or pole of the running-gear.

In carrying out the invention the running-gear illustrated is that belonging to a farm-wagon or a like vehicle, and comprises a front axle A, a rear axle B, forward hounds C, secured to the front axle, rear hounds D, attached to the rear axle, a reach E, attached to the rear axle and rear hounds, being pivotally connected with the forward axle, and forward and rear wheels 10 and 11, carried by corresponding axles.

A plate 12 is secured to the bottom portion of the forward hounds C, and a tongue or pole 13 is pivoted between the forward ends of the forward hounds, the said plate 12 having a slot at its rear end, whereby the heel of the pole or tongue may be given a downward inclination when desired, a pivot-pin 14 being passed through the hounds and through the pole adjacent to the forward end of the slot in the said plate.

A stirrup 15 is secured at the rear end or heel of the pole or tongue, the stirrup being pendent therefrom, and a pulley 16 is secured in the said stirrup, while a second stirrup 17 is attached to the forward under face of the plate 12 of the forward hounds, the latter stirrup being provided with a pulley 18. A lever 19 is fulcrumed at one side of the tongue or pole, and the said lever is adapted for engagement with a rack 20, secured to the pole, the rack and the lever being protected from interference from the team by means of a guard 21, and the upper end of the lever 19 is provided with a cable 22, which is carried rearward to be manipulated by the driver of the vehicle when desired.

A bracket 23 is secured upon the upper face of the forward hounds, the said bracket being preferably made to straddle the tongue or pole, and upon this bracket a lock-lever 24 is pivoted, adapted for engagement with a keeper 25, secured on the pole, and when this lock-lever is in engagement with the said keeper the pole will be held rigidly connected with the hounds and the vehicle may be backed in the usual way. When, however, the lock-lever 24 is disengaged from the keeper and the team is backed, the rear end of the pole will be given the downward and rearward inclination shown in Fig. 3. The lock-lever is provided, preferably, with an arm, which may be attached to a cable or its equivalent, and the cable be led upward to the driver, so that both the forward lever 19, which is the brake-lever, and the lock-lever may be manipulated at will without the driver leaving the vehicle.

A hanger 26 is secured to the rear end of each member of the forward hounds and each hanger is provided with a series of horizontally-located apertures 27. A link 28 is adjustably connected with each hanger 26 by passing a bolt through one end of the link and through one of the apertures 27 in the hangers, the lower end of each link being pivotally attached to a forward brake-beam 29, which brake-beam is provided with the usual brake-shoes 30, adapted for engagement with the forward wheels of the vehicle. Under this construction it is evident that the wear of the links or the wear of the brake-shoe may be readily compensated by the adjustment of the links in their hangers. A downward extension 26$^a$ from the hangers 26 will keep the links 28 steady and the brake-shoes square behind the wheels.

The forward brake-beam is normally held out of engagement with the forward wheels by means of springs 31, as shown in Figs. 1, 2, and 3. A cross-bar 32 is secured upon the rear hounds, and links 33 are pivotally connected with the ends of this cross-bar, the said links being attached to the rear brake-beam 34, provided with shoes 35 for engagement with the rear wheels of the vehicle, and the rear brake-beam is normally held away from the rear wheels by means of one or more springs 36.

An adjustable hook 37 or its equivalent is secured to the under face of the pole or tongue 13, and one end of a cable 38 is attached to this hook, the said cable being attached to a second cable 39, which is connected with the brake-lever 19 at its lower end. Ordinarily the two cables are carried rearward, one over and the other under the forward pulley 18. The cable 38 is continued rearward to an engagement with the pulley 16 at the heel of the pole, and is then attached to the forward brake-beam in any suitable or approved manner, preferably at a point near its center. A branch cable 40 is attached to the cable 38 at or near its rear end, and the said branch cable 40 is attached to the take-up device 41, (shown in Fig. 4,) the said take-up device consisting of a plate provided with a number of apertures 42, made longitudinally therein, and a rod 43, having an upturned end 44, which is made to enter one of the apertures in the plate, a cotter-pin or its equivalent being passed through the said upturned end above the plate, and the rear end of the rod 43 is attached to a cable 45, which cable is passed around a rear pulley 46, located upon the rear axle, and the said cable 45 is then returned in a forwardly direction and secured to the rear brake-beam 34. Thus it will be observed that the slack of the cables 38, 39, and 45 may be taken up by the take-up mechanism when necessary.

In the event of the team backing the lock-lever 24 is disengaged from the keeper on the tongue, the pole or tongue at its rear end will be given the downward inclination shown in Fig. 3, and the downward pressure of the pulley at the heel of the pole upon the cable or chain 38 will draw the same forwardly, causing the application to the wheels of both the forward and the rear brake-shoes, owing to the connection between the said cable and the brake-beams, and in going down a hill the act of holding back on the part of the horses will automatically apply the brakes.

Whenever it is desirable that the brakes shall be applied other than where they would be brought into action by the backing of the team, said brakes may be applied by simply drawing the brake-lever 19 in an inwardly direction.

While the lock-lever 24 is in engagement with its keeper the vehicle may be backed without bringing the brakes into action.

Having thus described my invention, I claim as new and desire to secure by Letters Patent—

1. In a vehicle running-gear, the combination, with a brake-beam and a pivoted tongue, of a flexible connection between the tongue forward of its pivot and the brake-beam, and a bearing located at the heel of the tongue, adapted for engagement with the aforesaid yielding connection between the tongue and the brake-beam, as and for the purpose set forth.

2. In a vehicle running-gear, the combination, with a brake-beam, springs normally holding the said beam away from the wheels, a pivoted tongue, and a flexible connection between the said tongue forward of its pivot and the brake-beam, of a bearing located at the heel of the tongue, being normally in engagement with the said flexible connection, the said bearing serving when the heel end of the tongue is depressed to cause the flexible connection to draw the brake-beam against the tension of its springs, as and for the purpose specified.

3. In a vehicle running-gear, the combination, with a brake-beam, springs normally holding the said beam away from the wheels, a pivoted tongue, and a flexible connection between the said tongue forward of its pivot and the brake-beam, of a bearing located at the heel of the tongue, being normally in engagement with the said flexible connection, the said bearing serving when the heel end of the tongue is depressed to cause the flexible connection to draw the brake-beam against the tension of its springs, a lever fulcrumed upon the tongue and attached to the aforesaid flexible connection between the tongue and brake-beam, and a locking device for the said lever, as and for the purpose specified.

4. In a vehicle running-gear, the combination, with the forward hounds, a brake-beam, a tongue pivoted between the said hounds, a flexible connection between the brake-beam and the tongue forward of the pivot-point of the latter, the heel end of the tongue having a bearing on the said connection, of a lever fulcrumed upon the tongue and likewise connected with the brake-beam, a rack for the said lever, and a guard for the lever and rack, as and for the purpose specified.

5. In a vehicle running-gear, the combination, with the forward hounds, a tongue pivoted therein, a brake-beam, and a connection between the brake-beam and the tongue, so made that when the heel of the tongue is depressed the brake-beam will be brought into operation, of a lock-lever carried by the hounds, and a keeper located on the tongue, whereby when the keeper is engaged by the lock-lever the tongue will be held rigid to the hounds, as and for the purpose set forth.

6. In a vehicle running-gear, the combination, with a support, and a bracket attached to the support and provided with a series of apertures, of a brake-beam, and a link connection between the brake-beam and the brackets, the said links being adapted for connection with the brackets at any apertured point therein, as and for the purpose specified.

VARDIMAN T. SWEENEY.

Witnesses:
WM. H. BAKER,
STITH T. NOE.